(12) United States Patent
Johnson

(10) Patent No.: US 7,487,951 B2
(45) Date of Patent: Feb. 10, 2009

(54) DOUBLE SLIDER VALVE FITMENT

(75) Inventor: James Johnson, Delaware, OH (US)

(73) Assignee: Liqui-Box Canada Inc., Whitby, Ontario (CA)

( * ) Notice: Subject to any disclaimer, the term of this patent is extended or adjusted under 35 U.S.C. 154(b) by 549 days.

(21) Appl. No.: 10/812,121

(22) Filed: Mar. 29, 2004

(65) Prior Publication Data

US 2004/0256424 A1 Dec. 23, 2004

Related U.S. Application Data

(60) Provisional application No. 60/458,077, filed on Mar. 27, 2003.

(51) Int. Cl.
  *F16K 51/00* (2006.01)
  *B65B 1/04* (2006.01)
(52) U.S. Cl. .......... 251/149.1; 251/149.6; 141/349
(58) Field of Classification Search .......... 222/505, 222/509, 518, 559; 141/349, 346; 137/614.04; 251/149.6, 149.1
See application file for complete search history.

(56) References Cited

U.S. PATENT DOCUMENTS

| 4,286,636 A | 9/1981 | Credle |
| 4,421,146 A | 12/1983 | Bond et al. |
| 4,445,551 A | 5/1984 | Bond et al. |
| 4,564,132 A * | 1/1986 | Lloyd-Davies ............ 222/522 |
| 5,697,410 A * | 12/1997 | Rutter et al. ............ 141/346 |
| 5,901,761 A * | 5/1999 | Rutter et al. ............ 141/346 |
| 6,347,785 B1 | 2/2002 | Copp et al. |
| 6,637,725 B2 | 10/2003 | Davis et al. |

* cited by examiner

*Primary Examiner*—Kevin P Shaver
*Assistant Examiner*—Stephanie E Tyler

(57) ABSTRACT

The present invention provides a fitment for attachment to a container for holding and dispensing a fluid. The fitment comprises a generally cylindrical spout having an external surface capable of mating with a collar of a dispensing connector, an external slider movable axially within said spout and an internal slider movable axially within the external slider. The internal slider is movable between a closed position that prevents the flow of fluid through the fitment and an open position that allows for the flow of fluid through the fitment. The internal slider is adapted to be moved between the closed and open positions by insertion of a dispensing connector into the external slider adjacent said internal slider. The internal slider is biased towards said closed position.

18 Claims, 24 Drawing Sheets

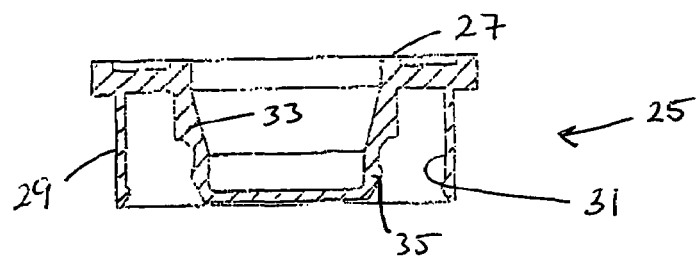
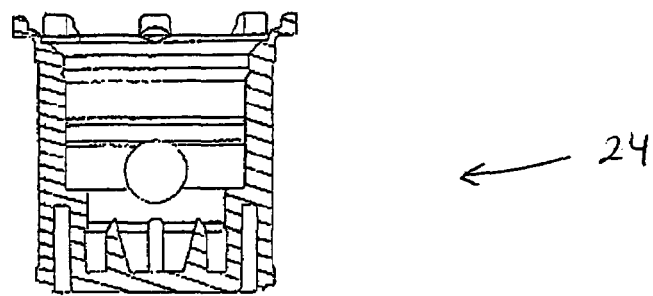
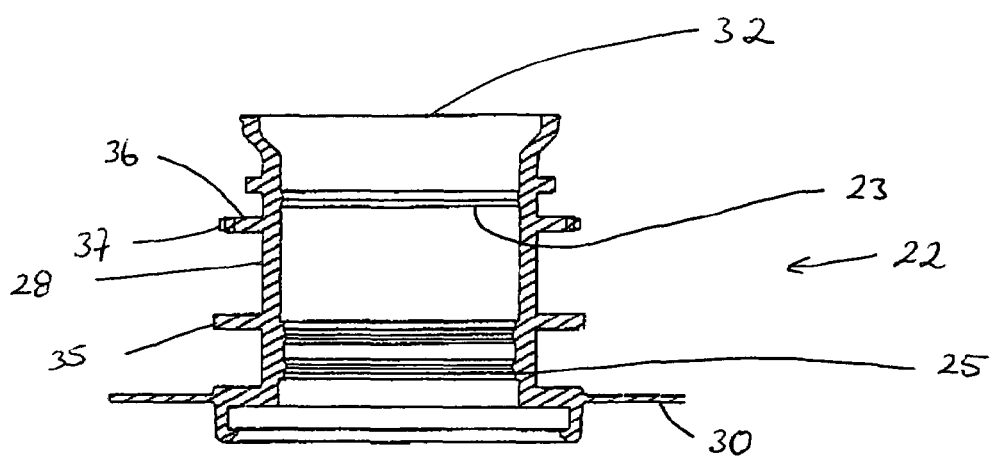
FIGURE 3

26 →

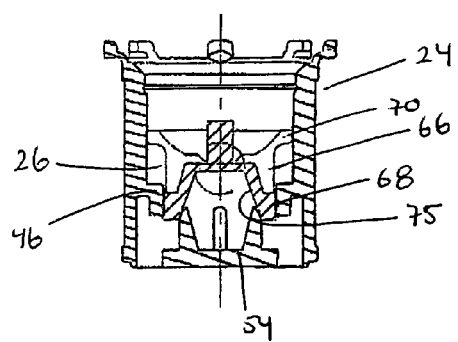
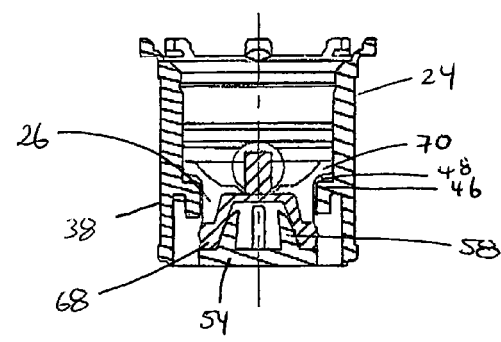
FIGURE 6                    FIGURE 7

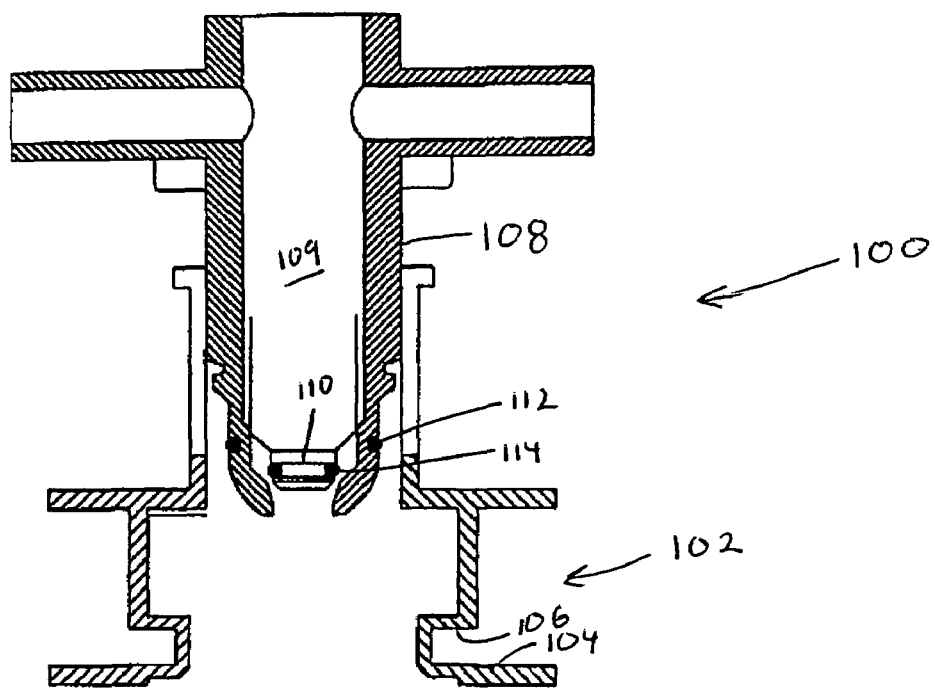
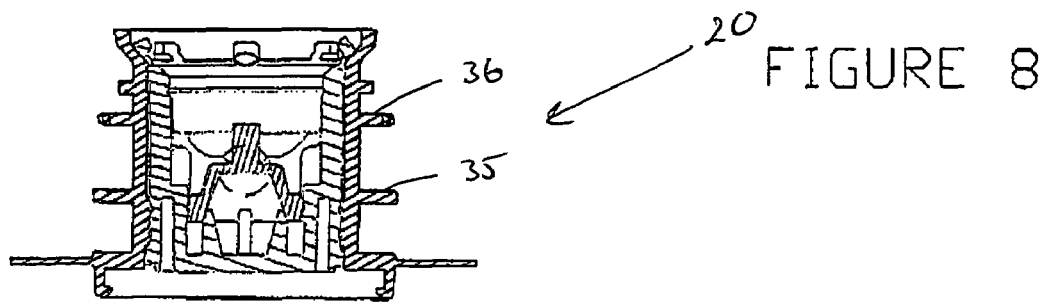
FIGURE 8

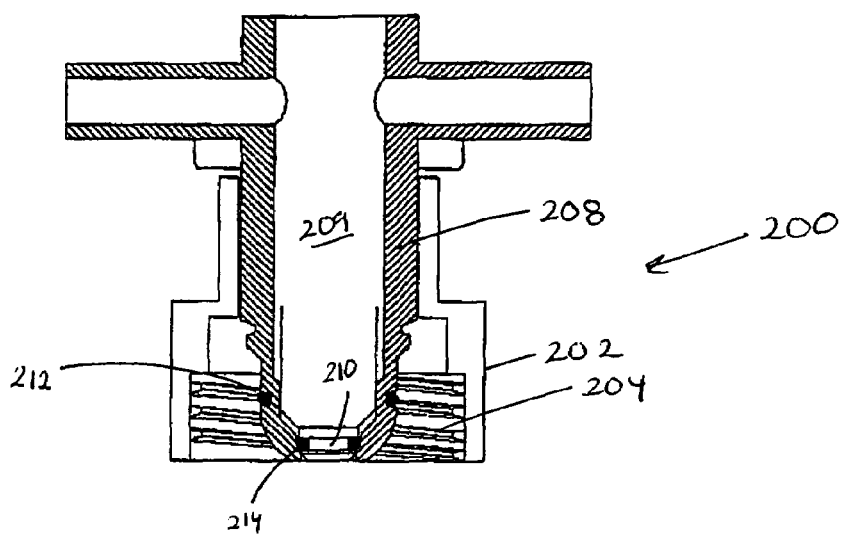
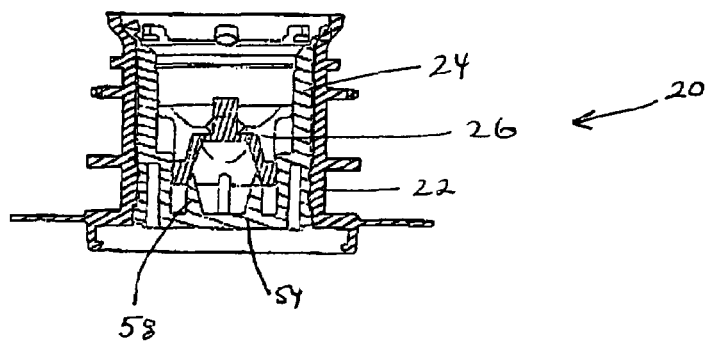
FIGURE 11

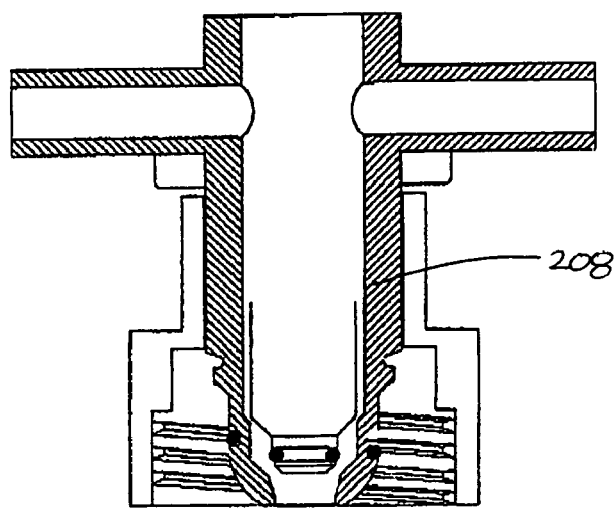
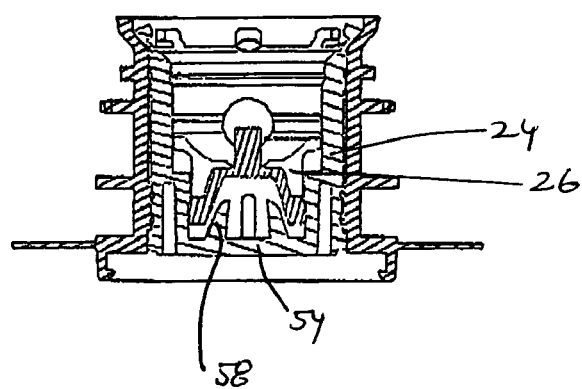
FIGURE 12E

1

DOUBLE SLIDER VALVE FITMENT

PRIORITY

This application claims the benefit of U.S. Provisional Application No. 60/458,077 filed Mar. 27, 2003, which is incorporated by reference herein in its entirety.

FIELD OF THE INVENTION

The present invention provides a quick-disconnect coupling and valve assembly for the dispensing of liquids and semi-liquids from a collapsible bag. More particularly the present invention relates to a fitment using a double slider valve for use in a quick-disconnect coupling and valve assembly.

BACKGROUND OF THE INVENTION

Many systems are used for dispensing beverage syrup from a disposable package consisting of a flexible collapsible bag in a corrugated box commonly referred to as a bag-in-box dispensing package.

Generally these systems include a bag that is provided with a fitment in the form of a spout through which filling and dispensing occurs. It is generally desirable to provide a quick-disconnect coupling between the spout and the service line of the pump or other type of beverage mixing and dispensing system. Such a coupling may be carried on the spout fitment of the bag and will work in conjunction with the service line connector, and is commonly called in the art a single-service valve and coupling since it is discarded with the bag when it is emptied. This type of valve opens automatically as the line connector is connected to the spout and closes as it is disconnected therefrom to prevent syrup from draining from the bag. An example of a single-service valve is illustrated in U.S. Pat. No. 4,286,636, which shows it in combination with a dip tube.

Other types of quick-disconnect couplings are known, however some systems are dedicated to only one type of currently known service line connection, for example the coupling disclosed in U.S. Pat. No. 4,445,551.

Some systems have recently been developed that are adapted to be used with various types of service line connectors. An example of such a system is illustrated in U.S. Pat. No. 6,347,785 which discloses a universal quick-disconnect coupling and valve. The fitment disclosed is adapted to be attached to a container for holding a liquid and includes a generally cylindrical spout that is capable of mating with a dispensing connector. A slider moves axially within the spout, and has a valve mounted within it that moves from a closed position to an open position upon insertion of a dispensing connector into the slider.

SUMMARY OF THE INVENTION

The present invention provides a fitment for attachment to a container for holding and dispensing a fluid. The fitment comprises a generally cylindrical spout having an external surface capable of mating with a collar of a dispensing connector, an external slider movable axially within said spout and an internal slider movable axially within the external slider. The internal slider is movable between a closed position that prevents the flow of fluid through the fitment and an open position that allows for the flow of fluid through the fitment. The internal slider is adapted to be moved between the closed and open positions by insertion of a dispensing connector into the external slider adjacent said internal slider. The internal slider is biased towards said closed position.

The present invention further provides a double slider valve for use in a fitment, having a spout, the fitment for attachment to a container for holding and dispensing a fluid. The double slider valve having an external slider movable axially within said spout and an internal slider movable axially within the external slider. The internal slider is movable between a closed position that prevents the flow of fluid through the fitment and an open position that allows for the flow of fluid through the fitment. The internal slider is adapted to be moved between the closed and open positions by insertion of a dispensing connector into the external slider adjacent said internal slider. The internal slider is biased towards said closed position.

The present invention also provides a container comprising the fitment described above.

DESCRIPTION OF THE DRAWINGS

The present invention is better understood with reference to the attached description and to the following Figures, wherein:

FIG. 3 is an exploded cross-sectional side elevational view of the double slider valve fitment of the invention;

FIG. 6 is a cross sectional view of the double slider valve fitment in the closed position;

FIG. 7 is a cross sectional view of the double slider valve fitment of FIG. 6 in the open, or dispensing, position;

FIG. 8 shows the initial position of one type of connector before insertion into the fitment;

FIG. 11 shows the double slider valve fitment as prepared for use with another type of conventional probe for dispensing the contents of the container prior to connection;

FIGS. 12A-E shows a series of operating positions of the connector and double slider valve fitment shown in FIG. 11;

DETAILED DESCRIPTION OF THE INVENTION

In a liquid dispensing apparatus such as is used to dispense individual servings of beverages and the like, the syrups, flavourings and other ingredients are frequently supplied in collapsible containers enclosed and shipped within an outer container ("bag-in-box"). The shipping package or container is provided with a fitment that accepts a probe that is part of the dispensing apparatus in order to connect the supply of liquid to the dispensing apparatus. The fitment generally contains a valve that is actuated by the insertion of the probe of the dispensing apparatus in order to allow the liquid to flow into the dispensing apparatus. The fitment attached to the liquid container is generally termed a package connector and the probe or similar device on the dispensing apparatus that interacts with the package connector is generally termed a dispensing connector.

The invention will be illustrated by reference to the drawings which illustrate a preferred embodiment thereof.

Figure 1:
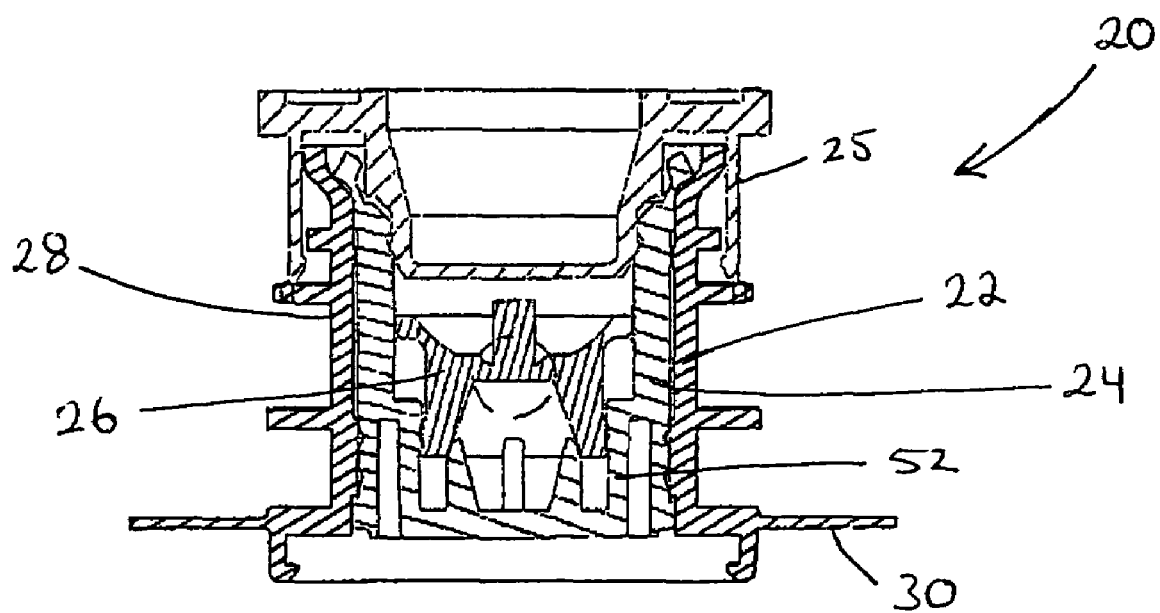
FIG. 1 illustrates a side view of a preferred embodiment of the double slider valve fitment of the present invention including a cap.

With reference to FIG. 1, the present invention provides a double slider valve fitment, illustrated generally at 20 for attachment to a container (not shown) for holding a liquid (not shown). The fitment 20 comprises a generally cylindrical spout 22 with a first generally cylindrical slider 24 movable axially within said spout, and an internal slider 26 movable axially within the external slider 24. The internal slider 26 is movable between a closed position that prevents fluid from flowing through the fitment to an open position that allows fluid to flow from the container through the fitment. Both positions are illustrated more clearly in FIGS. 10 and 11. The internal slider 26 is adapted to be moved between the closed and open positions by insertion of a dispensing connector into the external slider 24, adjacent the internal slider 26. As can be seen in FIG. 1, the internal slider 26 is sized to be received within the external slider 24, and is normally biased towards the closed position. The closed and open positions will be described in further detail below.

Figure 2:
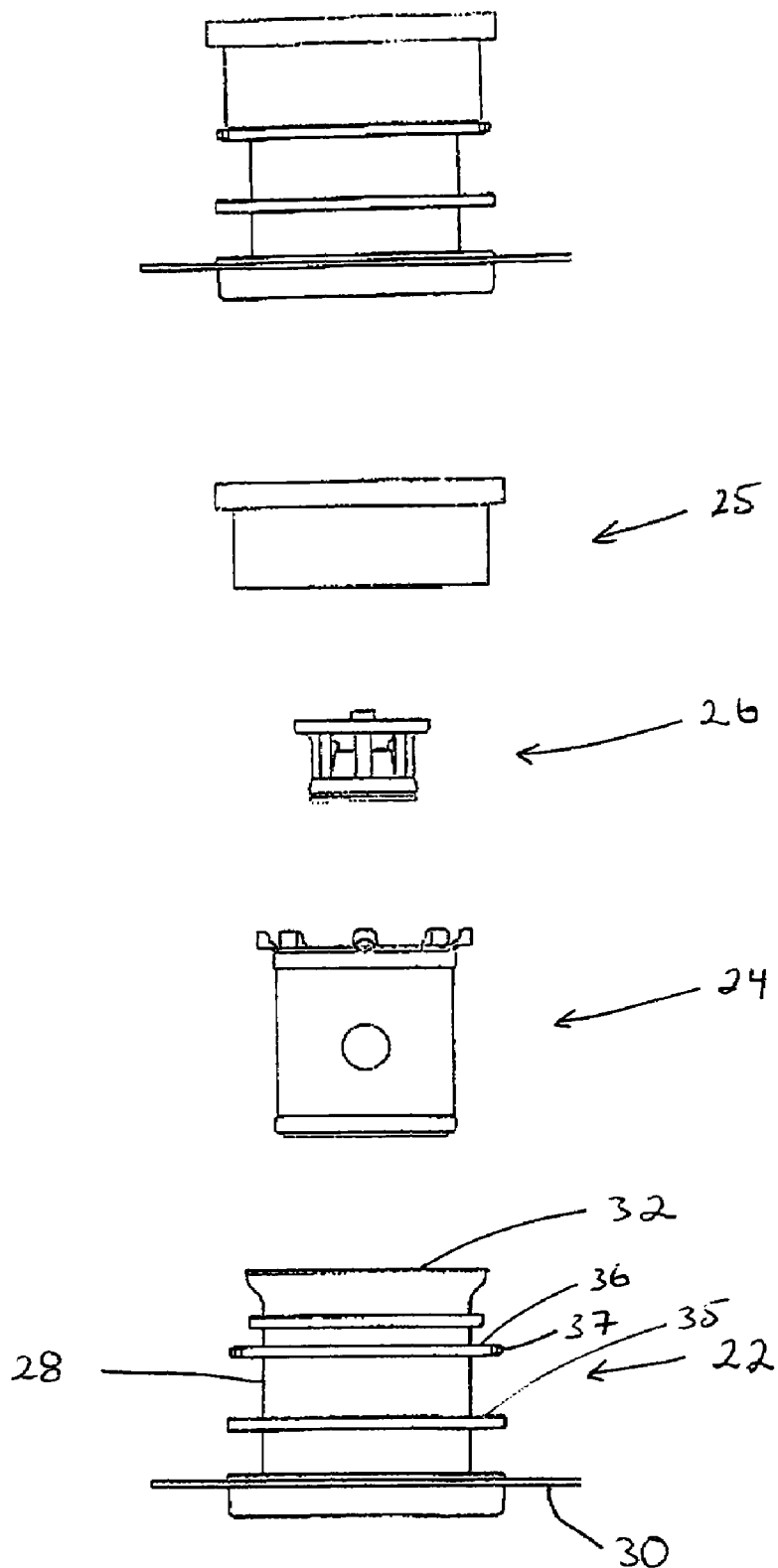
FIG. 2 is an exploded side elevational view of the double slider valve fitment of the invention.

Each of the components of the double slider valve fitment 20 will now be described with reference to the preferred embodiment of the present invention. As can be seen in FIGS. 1 through 3 the spout 22 is generally cylindrical shaped and has an external surface 28 capable of mating with a collar of a dispensing connector. At one end of the spout 22 there is a base portion 30 for attaching the spout to a wall of a container, not illustrated. Methods and means for attaching the spout 22 to a wall of a container are well known in the art and it will be understood that a variety of attachment mechanisms may be used to secure the spout of the present invention to a container wall, such as by heat sealing or adhesive attachment.

Located at the opposing end of the spout 22 from the base portion 30 is the spout opening 32 which is adapted to receive a dispensing connector therein. In one embodiment of the present invention the internal surface of the spout 22 includes an integrally molded stop ridge 23 and sealing rings 25, both of which serve to limit the motion of the slider at certain stages in the functioning of the coupling and dispensing valve. The stop ridge 23 and sealing rings 25 are further described in U.S. Pat. No. 6,347,785 (Copp et al.) the disclosure of which is herein incorporated by reference in its entirety.

Figure 9:
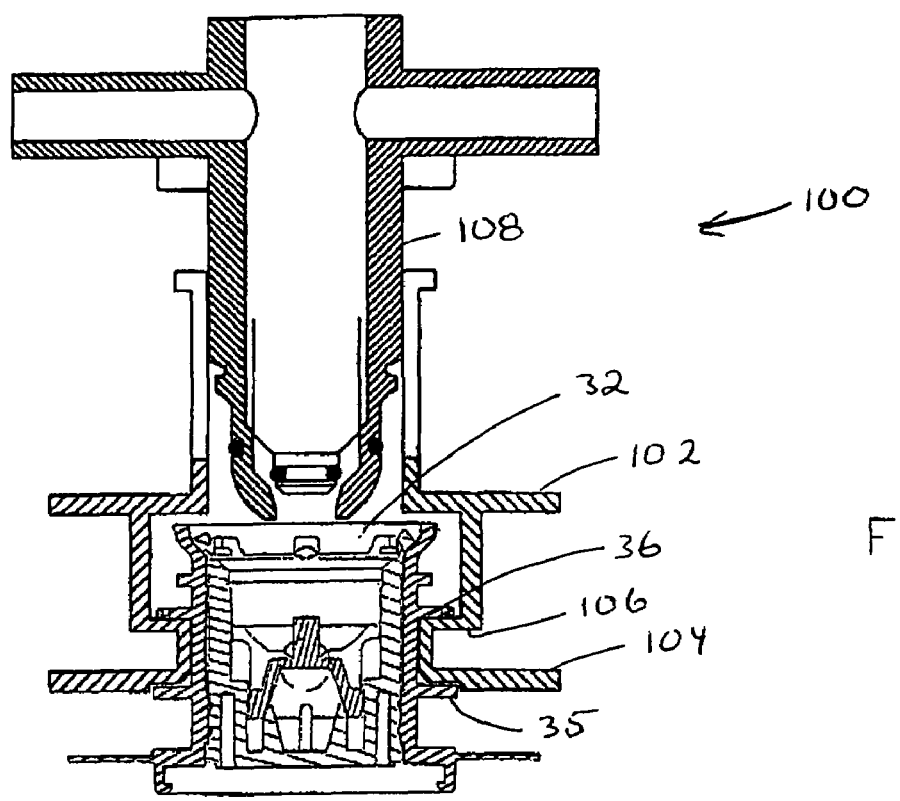
FIG. 9 shows the position of the probe of the connector shown in FIG. 8 with the connector attached to the fitment prior to insertion of the probe into the external slider.

As will be understood by a person skilled in the art, the external surface 28 of the spout 22 may include a series of external threads, not shown, which are adapted to mate with corresponding threads on one type of dispensing apparatus with which the double slider valve fitment 20 of the present invention may be used. In a preferred embodiment, as seen in FIGS. 1-3 the external surface 28 also includes a first external flange 35 and a second external flange 36. The second external flange 36 may also include at least two wings 37 extending outwardly therefrom, described further below. Both the first external flange 35 and the second external flange 36 are operable to mate with different dispensing connectors, as can be seen in FIGS. 8-12 and as described below. It will be understood by a person skilled in the art that different types of attachment means may be used on the external surface 28 of the spout 22 to connect it to various dispensing apparatuses with which it is to be used. For example, as illustrated in FIGS. 8-10 a flange may be used that cooperates with a mounting frame of one type of dispensing connector, described below. Alternatively, as shown in the preferred embodiment, at least a pair of wings 37 may be attached to at least one flange 36 located on the external surface 28 that will cooperate with an external frame of a different type of dispensing apparatus. An example of such wings is described in further detail in U.S. application Ser. No. 10/076,572 (Davis et al.) the disclosure of which is herein incorporated by reference in its entirety.

Figure 4B:
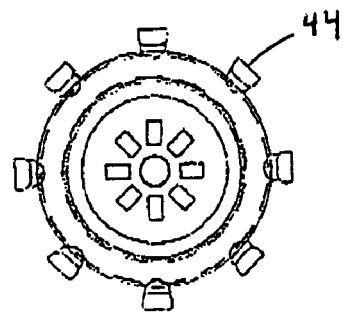
FIG. 4B is a front elevational view of the external slider of FIG. 4A.
Figure 4A:
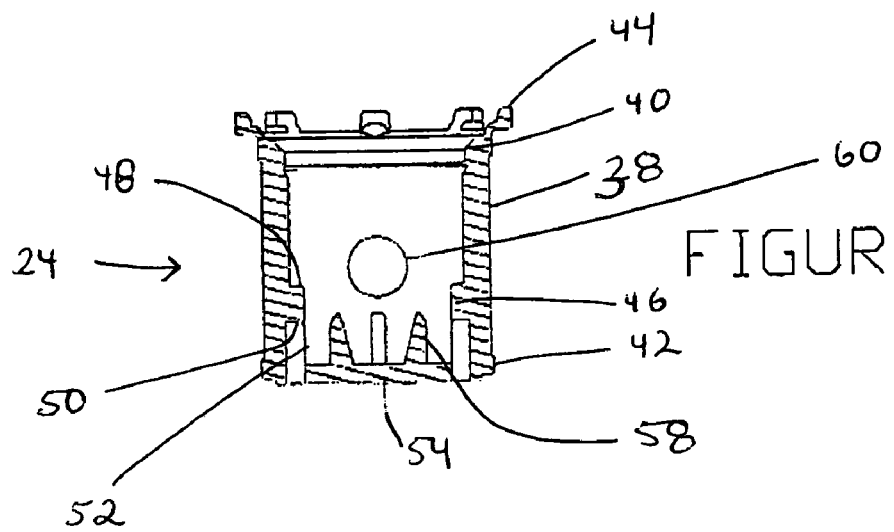
FIG. 4A is a cross-sectional side view of the external slider used in the double slider valve fitment of the invention.
Figure 4C:
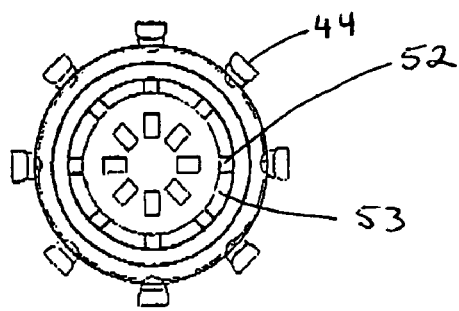
FIG. 4C is a rear elevational view of the external slider of FIG. 4A.

Turning now to FIGS. 4A-C, a preferred embodiment of the external slider 24 of the present invention will now be described. The external slider 24 is generally cylindrically shaped having an external shell 38 that includes a stop ridge 40 at one end and a positioning ring 42 at the opposing end. When the external slider 24 is positioned within the spout 22, shown in FIG. 1, the positioning ring 42 is located adjacent the base portion 30 of the spout 22, and the stop ridge 40 is located adjacent the spout opening 32. Extending outwardly from the stop ridge 40 are a plurality of spaced resilient gripping lugs 44, as described in U.S. Pat. Nos. 4,445,551 and 4,421,146 the disclosures of which are incorporated herein by reference. The lugs 44 are operable to be flexed inwardly and grip a dispensing connector (not shown) when the external slider 24 is moved axially within the spout 22 upon insertion of a dispensing connector (not shown), as is known in the art. It will be understood by a person skilled in the art that the gripping lugs 44 may comprise one or more lugs or may be removed depending on the end use and whether the additional gripping provided by the lugs is required in the embodiment within which the slider is to be used.

Within the external slider 24, adjacent the end with the positioning ring 42 is an interior ledge 46 that extends around the internal circumference of the shell 38. The ledge 46 has an upper surface 48 that faces the end of the shell 38 containing the stop ridge 40, and a lower surface 50 that faces the end of the shell 28 containing the positioning ring 42. Extending away from the lower surface 50 towards the end of the shell 38 which includes the stop ridge 40, are a series of radially spaced posts 52 defining apertures 53 between adjacent posts 52. The posts 52 are more clearly shown in FIG. 1. The posts 52 support a valve seat 54 at their lower ends 56. The posts 52 extend substantially parallel to the shell 38 of the external slider 24 and are spaced from the shell 38 such that liquid may flow between the shell 38 and the posts 52 and through the space between each post 52. The valve seat 54 is substantially circular and extends between the lower ends of the spaced posts 52.

The valve seat 54 includes a plurality of spaced projections 58 that extend upwardly from the valve seat 54 towards the ledge 46. The projections 58 are preferably centrally located on the valve seat 54 and are radially spaced thereon and are operable to be received in the internal slider 26 as will be described below. It will be understood by a person skilled in the art that the projections 58 may be spaced in any pattern and may form any shape that performs the same function as the projections 58 described in the preferred embodiment, as will be understood from the description below. The function of the projections 58 will also be described below in relation to the internal slider 26. Alternative shapes and dimensions of the projections 58 are described below in relation to different embodiments of the present invention.

The external slider 24 may optionally include at least one aperture 60 located in the side wall of the shell 38 adjacent the upper surface 48 of the ledge 46. The at least one aperture 60 may assist the flow of liquid from a container (not shown) to which the fitment 20 is attached through to the dispensing connector (not shown), depending on the type of connector the container is attached to.

Figure 5B:
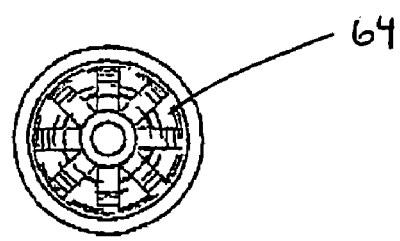
FIG. 5B is a front elevational view of the internal slider of FIG. 5A.
Figure 5A:
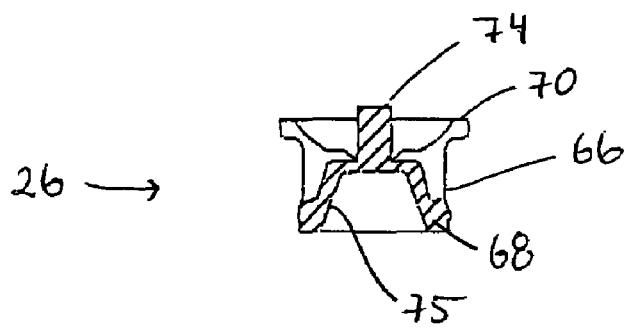
FIG. 5A is a cross-sectional side elevational view of the internal slider used in the double slider valve fitment of the invention.
Figure 5C:
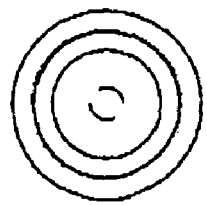
FIG. 5C is a rear elevational view of the internal slider of FIG. 5B.

Turning now to FIGS. 5A through 5C the internal slider 26 will now be described. Located on the internal slider 26 are a series of ports 64 that allow the passage of fluid therethrough when the internal slider 26 is in the open position. When in the open position, the ports 64 are in fluid communication with the apertures 53 between the posts 52 of the external slider 24, as can be seen more clearly in FIG. 7.

In a preferred embodiment, shown in FIGS. 5A-C, the internal slider 26 includes a generally cylindrical body 66 with a base ring 68 that extends around one end of the body 66, and a top ring 70 that extends outwardly from and around the opposing end of the body 66 from the base ring 68. A central post 74 extends away from the body at the opposing end to the base ring 68, and is operable to engage the probe of a dispensing connector, not shown, when the fitment 20 is attached to a dispensing connector.

As can be seen in FIGS. 6 and 7, the body 66 is sized to be received within the external slider 24 extending beyond the ledge 46 of the external slider 24 and operable to abut the valve seat 54. The top ring 70 is sized to extend beyond the circumference of the body 66 to rest against and abut the ledge 46 when the internal slider 26 is in the open position, shown in FIG. 7. In the open position, the insertion of a dispensing connector moves the plug 26 towards the valve seat 54 and positions the base ring 68 of the body 66 adjacent the valve seat 54. The projections 58 on the valve seat 54 are biased inwardly by the internal walls of the body 66 of the internal slider 26.

In the preferred embodiment the internal walls 75 of the body 66 are sloped inwardly to bias the projections 58 inwardly when the plug 26 is located adjacent the valve seat 54, as can be seen in FIG. 7. When the dispensing connector is removed, the projections 58 will return to their normally biased position and flex outwardly. When the projections 58 move outwardly, the internal slider 26 will be forced away from the valve seat 54 and the internal slider 26 will return to the closed position, shown in FIG. 6. Other embodiments may be utilised that force the projections to bend away from their normally biased position upon insertion of the line connector into the fitment, provided that when the line connector is removed the projections will force the internal slider 26 away from the valve seat 54 to the closed position.

When the internal slider 26 returns to the closed position, it may return to either a its initial position or to one in which the top ring 70 is lower than in the initial position, i.e. closer to the ledge 46, provided that there is a seal between the internal slider 26 and the external slider 24, and no fluid can pass through the fitment 20. The closed position referred to in the description includes both such positions in which the internal slider 26 is moved away from the valve seat 54 as described above, and where no fluid can pass through the fitment 20.

It will be understood by a person skilled in the art in light of the above description that the external slider is operable to move along the inside of the spout in a smooth telescoping movement while maintaining continuous contact with the spout to provide a seal there between. Likewise the internal slider is operable to move along the inside of the external slider in a smooth telescoping movement. Further the internal slider acts like a plug within the external slider and is seated within the external slider in the open position to allow fluid to pass through and is unseated in the closed position to prevent fluid from passing through. Variations on the shape and dimensions of the internal and external sliders are included in the present invention provided that they perform the function of the sliders discussed herein.

In the preferred embodiment of the present invention, as shown in FIGS. 1-3 a cap 25 may be provided to protect the double slider valve fitment and keep it clean during shipping and storage. As shown in FIG. 3, the cap 25 may include a cover 27, and a skirt 29 bearing an outer retaining ring 31 for retaining the cap 25 on the fitment 20 during shipping, and an internal cylinder 33 bearing an internal retaining ring 35 which retains the cap 25 on the external slider 24 when the cap 25, external slider 24, and internal slider 26 are removed as a unit in order to fill the container. An example of a suitable cap that may be used is further disclosed in U.S. Pat. No. 6,347,785 the subject matter of which is herein incorporated by reference. Other alternatives will be apparent to a person skilled in the art.

The open and closed positions of the external slider 24 and the internal slider 26 will now be described in more detail with reference to FIGS. 6 and 7. The closed position of the fitment 20 is illustrated in FIG. 6. In the closed position the internal slider 26 is received in the external slider 24 with the top ring 70 spaced from the upper surface 48 of the ledge 46. The base ring 68 of the internal slider 26 abuts against the upper ends of the posts 52 of the external slider 24 and blocks any flow of fluid through the apertures 53 located between the posts 52. The closed position prevents any fluid from passing through the fitment 20 into the dispensing connector.

In the open position, illustrated in FIG. 7 in which a dispensing connector, not shown, applies a downward force on the internal slider 26, the internal slider 26 is moved axially within the external slider 24 towards the valve seat 54. The top ring 70 of the internal slider 26 rests adjacent the upper surface 48 of the ledge 46, preventing further axial movement of the internal slider 26 towards the valve seat 54. It will be understood by a person skilled in the art that further axial movement of the internal slider 26 may be prevented by either the top ring 70 abutting the ledge 46 or the position of the valve seat 54 adjacent the internal slider 26 or by both. The base ring 68 rests against the valve seat 54 and the projections 58 on the valve seat 54 are biased inwardly by the internal walls 75 of the body 66 of the internal slider 26. In this position the ports 64, not shown, of the internal slider 26 are in fluid communication with the apertures 53 located between the posts 52 on the external slider 24, and fluid can flow from the container between the shell 38 and the valve seat 54 through the apertures 53 between the posts 52 and through the ports 64 on the internal slider 26, into the dispensing connector. The open and closed position will be described in further detail below in relation to the use of the fitment 20 on a container with two different types of dispensing connectors. However, it will be understood that the fitment 20 may be used with many different types of dispensing connectors known in the art, for example, but not limited to, those illustrated and discussed in U.S. Pat. No. 6,347,785.

Once the dispensing connector is removed the downward pressure on the internal slider 26 is released and the projections 58 will move to their normally biased position and push outwardly against the internal walls 75 of the body 66 which will push the internal slider 26 up and away from the valve seat 54 towards the closed position, described above.

The use of the double slider valve fitment 20 with a dispensing connector will now be described. FIG. 8 illustrates the initial position of one type of dispensing connector 100 before it is used with the fitment 20 of the present invention. A mounting frame 102 is attached to the fitment 20 to provide a means for attaching the support structure, not shown, of probe 108 of the connector 100, to the fitment 20. The mounting frame 102 is provided with flanges 104 and 106 that are spaced apart to fit snugly between flanges 35 and 36 of fitment 20. The probe comprises a body 108 having a central channel 109 and a valve member 110 as well as sealing O-rings 112 and 114, as well as spring means, not shown, to hold the valve member 110 in its closed position when the probe 108 is not inserted into the fitment 20.

FIG. 9 shows the connector 100 attached to the fitment 20 with mounting frame 102 connected by flanges 104 and 106 located between flanges 35, 36 on fitment 20. The probe 108 is spaced form the fitment 20 and located above spout opening 32.

FIGS. 10A-E shows a series of positions during the insertion and removal of the probe 108 of FIG. 9 into the fitment 20.

Figure 10A:
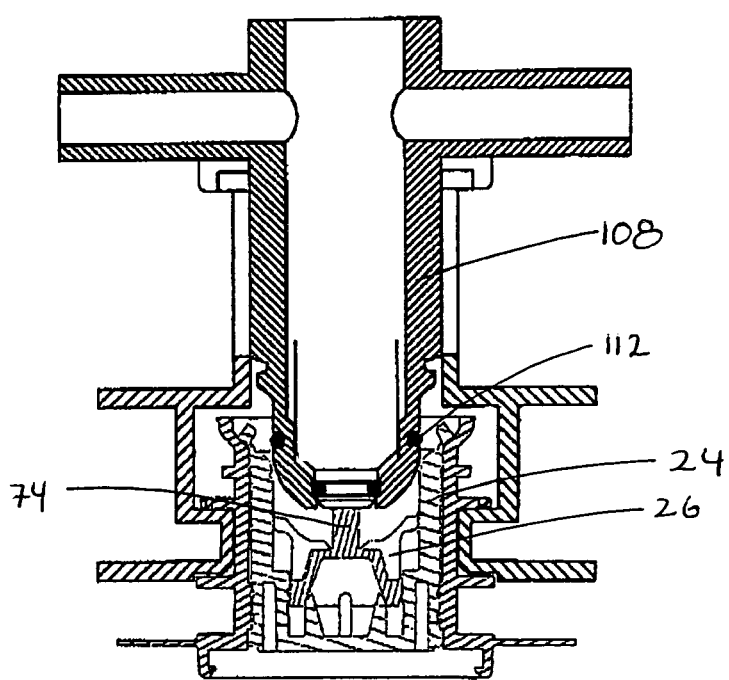
FIGS. 10A-E shows a series of operating positions of the connector and fitment shown in FIGS. 8 and 9.
Figure 10B:
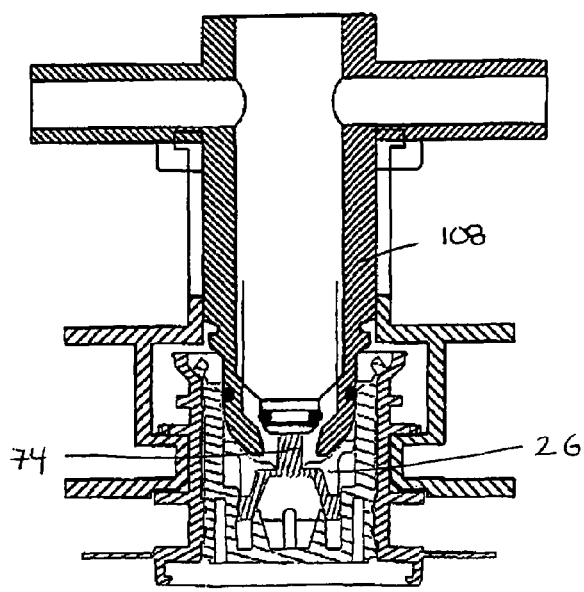
Figure 10C:
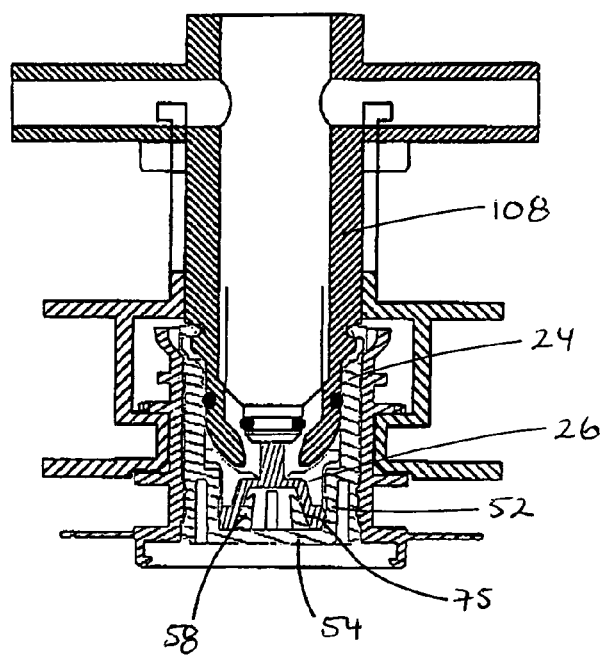

FIG. 10A shows the initial position of probe 108 as it is advanced into the external slider 24. In FIG. 10B the probe body 108 is sealed within the external slider 24 by the-outside O-ring 112. FIGS. 10B and 10C show the advancement of probe 108 into external slider 24. FIG. 10B shows the probe 108 abutting the internal slider 26 with central post 74 extending into the probe 108.

FIG. 10C shows the position of internal slider 26 when the probe 108 extends further into external slider 24, pushing internal slider 26 towards and abutting against valve seat 54. In this position ports 64 are in fluid communication with the apertures 53 located between posts 52. The projections 58 are biased inwardly by the internal walls 75 of the body 66 of the internal slider 26. The fitment 20 is in the open position.

Figure 10D:
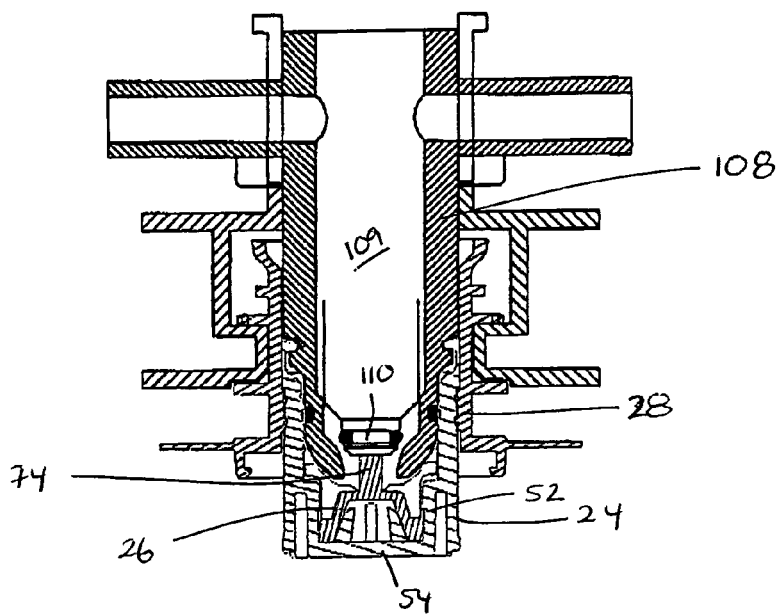

In FIG. 10D the probe 108 is moved further into the fitment 20 and the external slider 24 moves axially within the shell 28 and extends into the liquid container. The internal slider 26 remains fully depressed adjacent the valve seat 54 of the external slider 24. The valve member 110 of the dispensing connector 100 remains open through contact with the central post 74 of the internal slider 26. The liquid can then flow from the container through the apertures 53, not shown, located between the posts 52 and through the ports 64, not shown, in the internal slider 26 and into the central channel 109 of the dispensing connector 100.

Figure 10E:
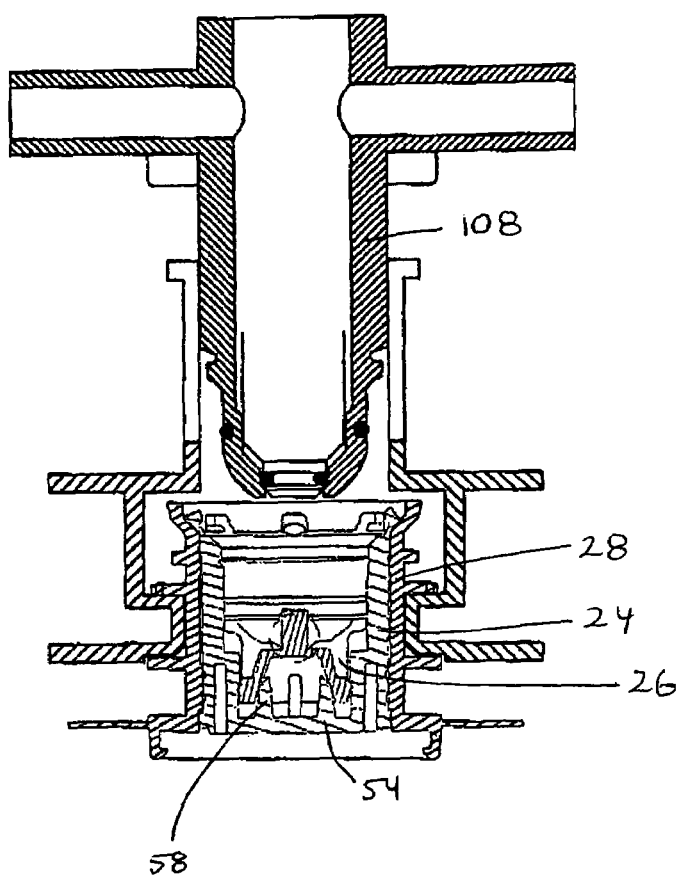
Figure 12A:
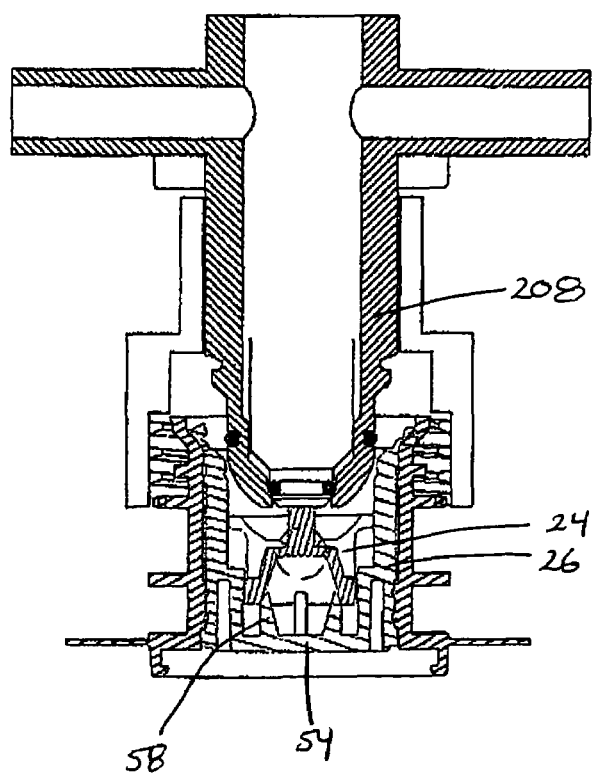
Figure 12B:
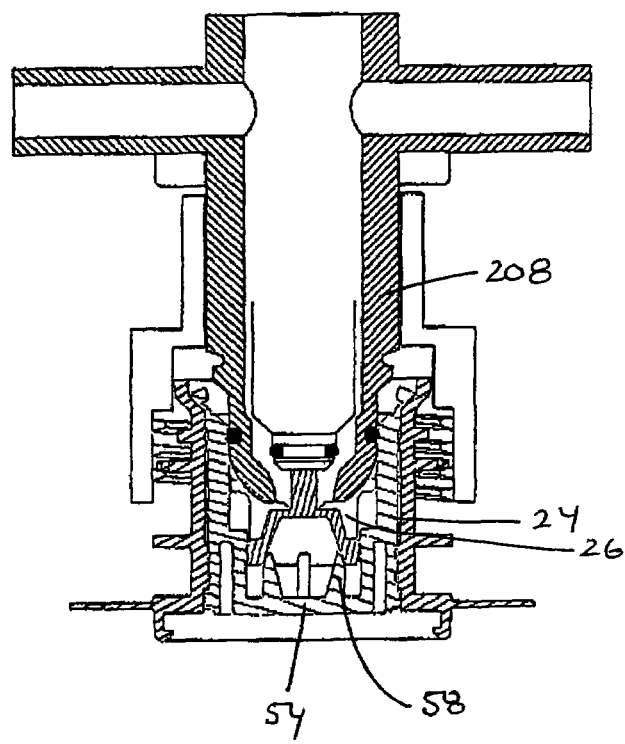
Figure 12C:
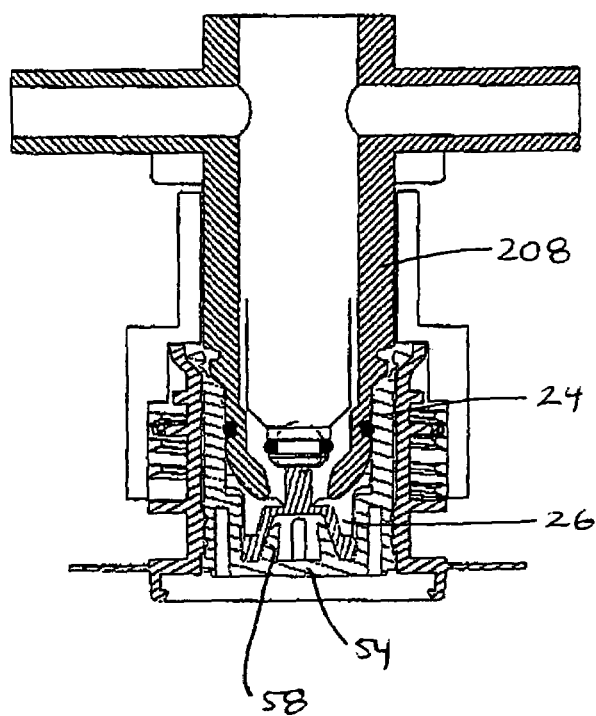
Figure 12D:
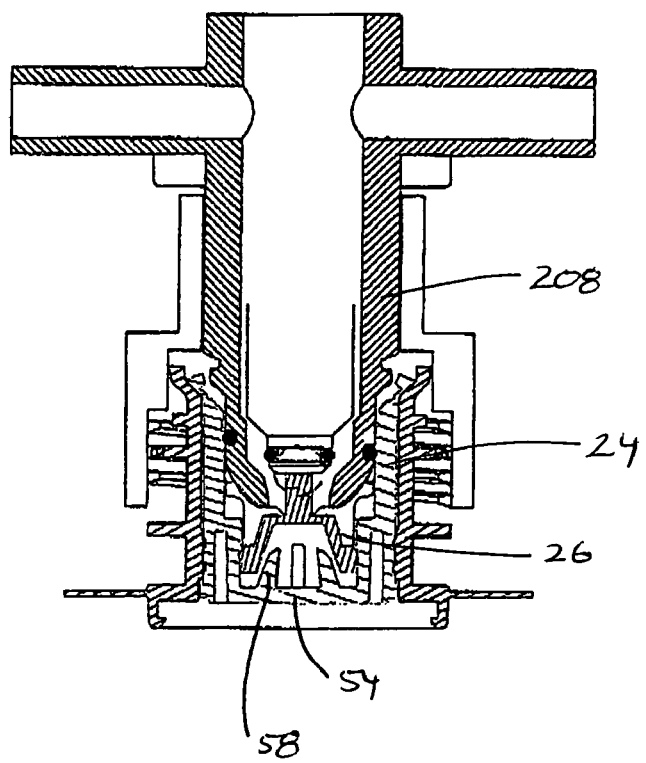

FIG. 10E shows the probe 108 removed from the fitment 20 after the liquid has been dispensed. As can be seen the external slider 24 has been withdrawn from the container back into the shell 28. Internal slider 26 is moved upwardly and away from valve seat 54 due to the biasing of the projections 58 outwardly to their normal position once the downward pressure of the probe 108 is removed.

FIG. 11 shows the initial position of connector-valve as prepared for use with a third type of dispensing connector 200 having a threaded collar 202. The threaded collar 202, having internal threads 204 is positioned to engage the external threads 34 of the spout 22. The probe 208 of the dispensing connector 200 is sized to fit in sealing engagement within the body of the external slider 24. The probe 208 has a central channel 209, and includes a valve member 210 and sealing O-rings 212 and 214, as well as spring means, not shown, to hold the valve member 210 in its closed position when the dispensing connector 200 is not inserted into the fitment 20.

FIGS. 12A-E show the dispensing connector 200 of FIG. 11 in a series of operating positions identical to those illustrated in FIG. 10A-E. Reference numerals for the same structures have been kept and numerals of similar structure have been increased by 100. As can be seen from FIGS. 12A-E when the fitment 20 is used with dispensing connector 200 the external slider 24 is not moved into the container, not shown, by the probe 208.

It will be understood by a person skilled in the art the fitment 20 may be used with various dispensing connectors. It is known that dispensing connectors may attach to fitments in various ways, including those described above with reference to FIGS. 10 through 12. It will therefore be understood that when the fitment 20 is attached to a dispensing connector, depending on how the connection is formed and how the dispensing connector works, the external slider 24 may or may not be moved axially inside the spout 22 to extend into the container.

In each case when the probe is removed from the fitment 20 the projections 58 located on the valve seat 54 force the internal slider 26 away from the valve seat 54 of the external slider 24 to the closed position to prevent leakage from the container. Similarly the spring members of the dispensing connectors operate to seal the valve members of the dispensing connectors.

Alternative embodiments for the external slider 24 and the internal slider 26 will now be discussed with reference to FIGS. 13 though 16.

Figure 13:
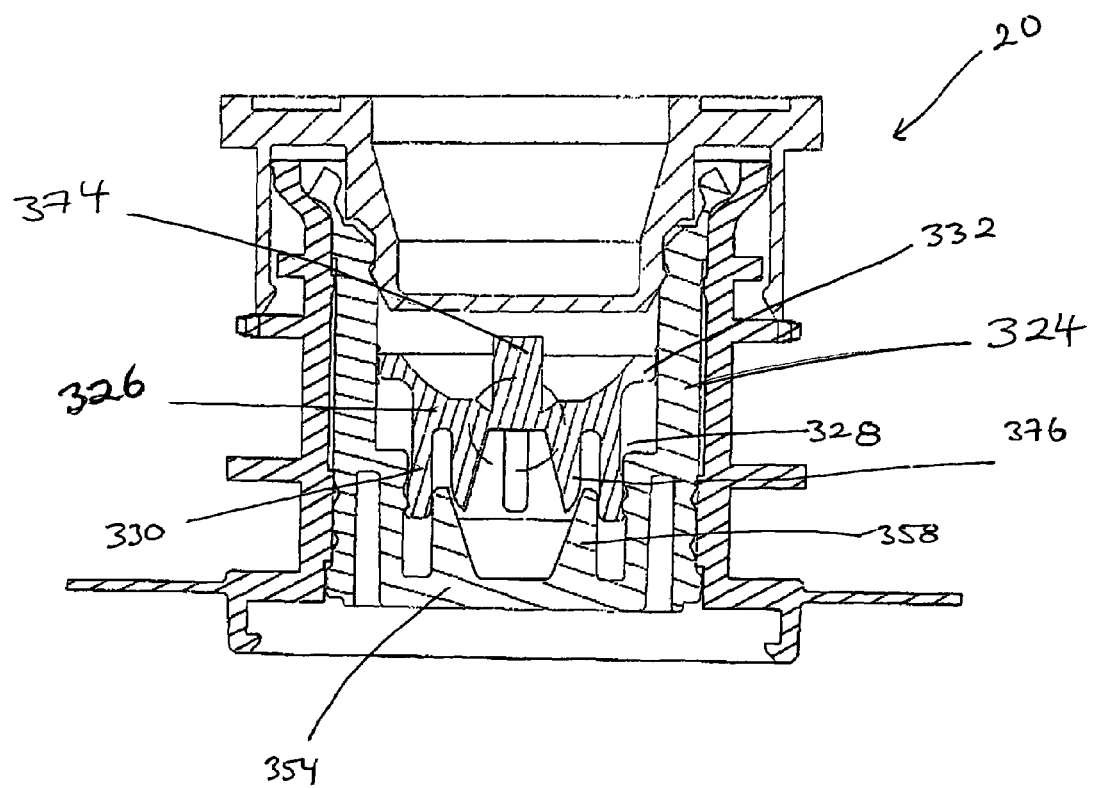
FIGS. 13 though 16 show alternative embodiments of the double slider valve fitment of the present invention.

FIG. 13 shows an alternative embodiment of the fitment 20 of the present invention in which the external slider 324 and the internal slider 326 differ. As discussed in the embodiment above, the external slider 324 includes a valve seat 354 having a plurality of spaced projections 358 that extend upwardly from the valve seat 354.

The internal slider 326 includes a lower body portion 328 with outer walls 330 and an upper ring portion 332 that extends outwardly from and around the opposing end of the lower body portion 328 from the outer walls 330. A central post 374 extends away from the lower body portion 328 and is operable to engage the probe of a dispensing connector, not shown, when the fitment 20 is attached to a dispensing connector. A series of flexible fingers 376 extend away from the upper ring portion 332 within the area defined by the outer walls 330 and spaced therefrom, towards the valve seat 354 of the external slider 324, when the internal slider 326 is located within the external slider 324 assembled. The flexible fingers 376 are positioned to abut against the inside surface of the spaced projections 358 located on the external slider 324.

As discussed in the embodiment above, located on the internal slider 326 are a series of ports, not shown, that allow the passage of fluid therethrough when the internal slider 326 is in the open position. The internal slider 326 and the external slider 324 work in the same manner as described above. When in use a dispensing connector, not shown, applies a downward force on the internal slider 326 pushing it towards the valve seat 354 on the external slider 324. As the internal slider 326 is moved towards the valve seat 354 the fingers 376 are biased inwardly by the inside surfaces of the spaced projections 358. The internal slider 326 is moved until it reaches the open position in which the fingers 376 abut against the valve seat 354 and fluid can pass through the container between the posts, not shown, of the external slider 326 and through the ports, not shown, on the internal slider 326. When the dispensing is complete the dispensing connector is removed from the internal slider 326 and the resilient fingers 376 flex outwardly towards their normal position pushing against the inside surfaces of the projections 358. The outward movement of the fingers 376 pushes the internal slider 326 away from the valve seat 354 and the internal slider 326 returns to the closed position.

As will be understood from the above description the biasing action of the flexible fingers 376 against the projections 358 performs the same function as the internal biasing of projections 58 on the valve seat 54 by the internal walls 75. It will be understood by the description provided herein that in all of the embodiments discussed once a dispensing connector is removed from the internal slider the biasing action between the parts of the external slider and the parts of the internal slider causes the internal slider to move away from the valve seat of the external slider and into the closed position.

Figure 14:
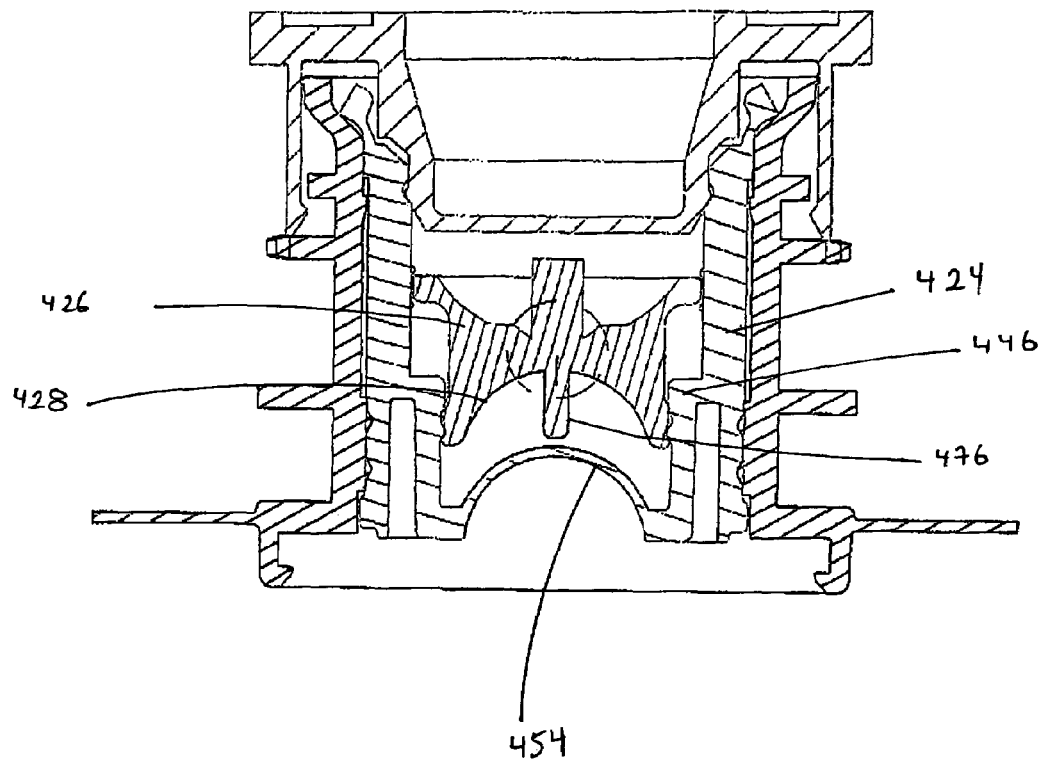
Figure 15:
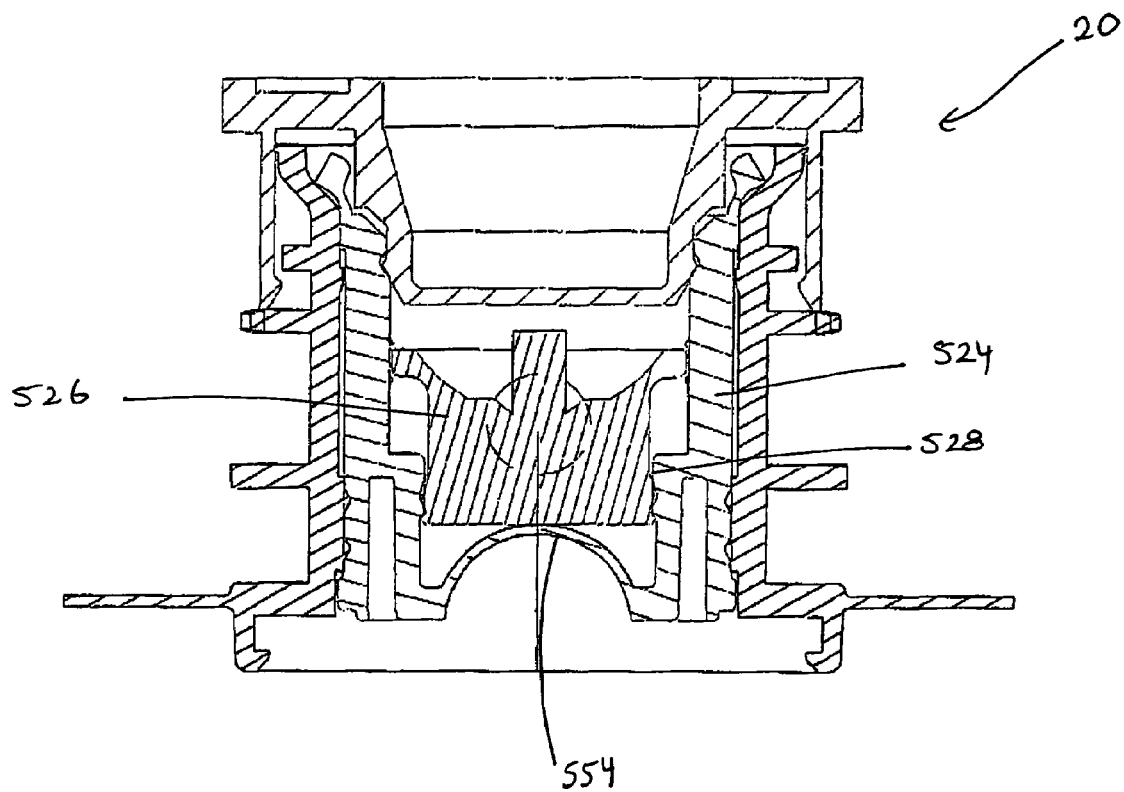
Figure 16:
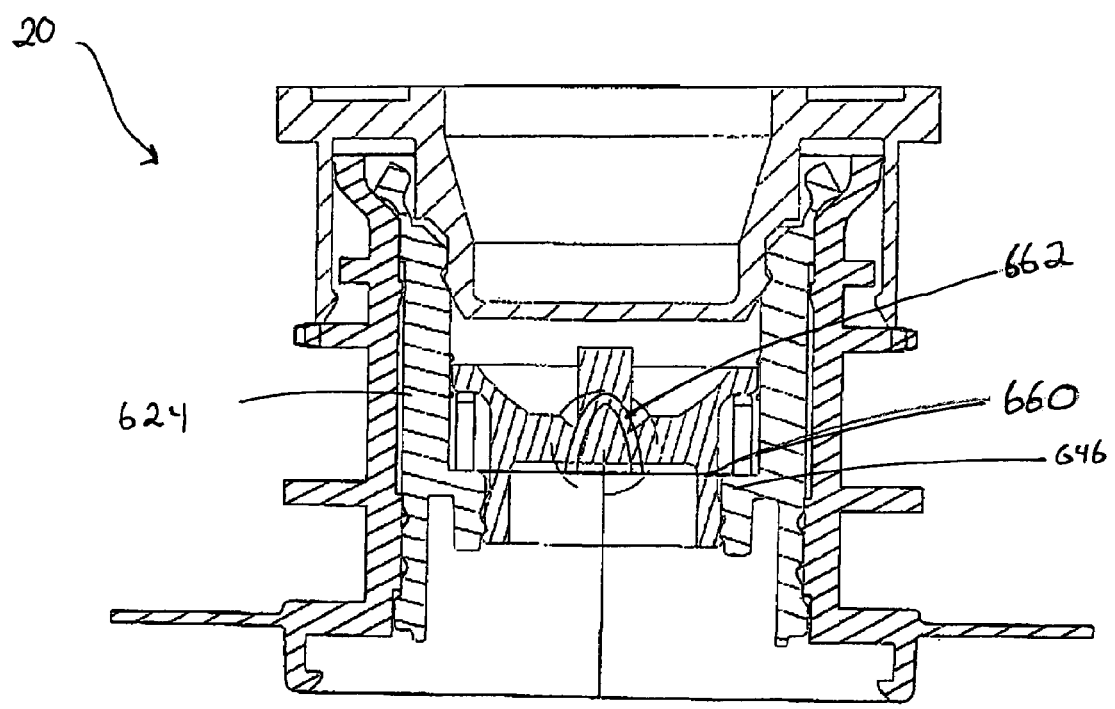

FIGS. 14 through 16 illustrate other embodiments that fall within the scope of the invention to achieve the biasing action between the external slider and the internal slider, and will now be described.

As can be seen in FIG. 14, the external slider 424 includes a valve seat 454 that is flexible and curves towards the internal ledge 446. The internal slider 426 includes a lower body portion 428 that has an internal configuration that is shaped to correspond to the shape of the valve seat 454. Extending away from the lower body portion 428 in the opposite direction to the central post 474 is a second post 476. The second post 476 is positioned to abut and flex the valve seat 454 when the internal slider 426 is moved axially towards the valve seat 454 by a dispensing connector, not shown. When a dispensing connector pushes the internal slider 426 towards the valve seat 454, the second post 476 will abut against the valve seat 454 and flex the valve seat 454 towards the container, not shown, until the internal slider 426 is in the open position and fluid can pass therethrough. Once the dispensing connector is removed and there is no pressure forcing the internal slider 426 against the valve seat 454, the valve seat 454 will flex upwardly and return to its normal position, as shown in FIG. 14. As the valve seat 454 returns to the normal position it pushes against the second post 476 and moves the internal slider 426 away from the valve seat 454 back into the closed position.

Turning to FIG. 15 a further alternative embodiment of the fitment 20 is illustrated in which the external slider 524 has the same configuration as that described in FIG. 14 above. The internal slider 526 in this embodiment includes a lower body portion 528 that is solid and in the closed position may lie adjacent the upper surface of the curved valve seat 554 of the external slider 524. It will be understood that the lower body portion 528 may be located at any position above the valve seat 554 and does not have to lie adjacent the top surface. When a dispensing connector, not shown, is connected to the fitment 20 the internal slider 526 is forced axially downwards towards and against the valve seat 554 which causes the valve seat 554 to flex inwardly towards the container, not shown. Once the dispensing connector is removed and the internal slider 526 is no longer pushed towards the valve seat 554, the valve seat 554 flexes back into its normal position, and in so doing pushes the lower body portion 528 and thereby the internal slider 526 away from the valve seat 554 and into the closed position.

FIG. 16 illustrates a further alternative embodiment of the fitment 20 of the present invention. As can be seen from the Figure the external slider 624 does not include the valve seat discussed above in FIGS. 1 through 15 but includes an internal valve wall 660 that extends across the internal diameter of the external slider 624 at the location of the internal ledge 646. The internal valve wall 660 includes a projection 662 that extends towards the spout opening of the fitment 20 when the external slider 624 is located therein. The internal valve wall 660 includes openings, not shown, that allow the walls 664 of the lower body portion 628 of the internal slider 626 to pass therethrough, between posts 652.

The internal slider 626 includes a lower body portion 628 and an upper ring portion 632, the lower body portion 628 includes walls 664 that extend away from the upper ring portion 632 and slide between posts 652 of the external slider 624 when the internal slider 626 is located therein. The lower body portion 628 includes a hollow central portion defined by the internal surface of the walls 664 and by an upper ledge 666.

When a dispensing connector, not shown, is attached to the fitment 20 and pushes the internal slider 526 towards the internal valve wall 660 to the open position, the projection 662 is compressed by the upper ledge 666 of the internal slider 626. When the dispensing connector is removed and no pressure is placed on the internal slider 626 the projection 662 will return to its normal position and flex against the upper ledge 666 moving the internal slider 626 back into the open position.

Figure 17B:
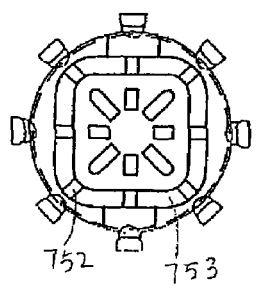
FIG. 17B is a rear elevational view of the alternative embodiment of the external slider of FIG. 17A.
Figure 17D:
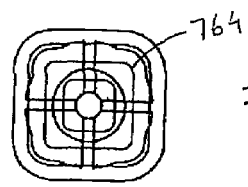
FIGS. 17D and E show front and rear elevational views, respectively, of the alternative embodiment of the internal slider of FIG. 17C.
Figure 17C:
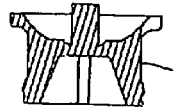
FIG. 17C is a cross sectional side elevational view of an alternative embodiment of the internal slider of the present invention.
Figure 17A:
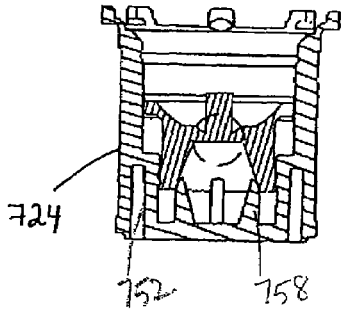
FIG. 17A is a cross-sectional side view of an alternative embodiment of the external slider of the present invention.
Figure 17E:
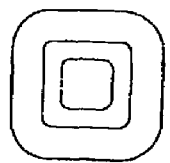

FIGS. 17A-E illustrate a further embodiment of the external slider 724 and the internal slider 726 of the present invention. As can be seen the external slider 724 has an outer cylindrical shape that corresponds to the internal cylindrical shape of shell, not shown, within which the external slider 724 is located during use. The internal geometry of the external slider 724 can however be of any shape, as shown in FIG. 17B in which the cross section of the internal geometry of the external slider 724 is substantially square. The internal slider 726 has a geometry that corresponds to the internal geometry of the external slider 724 to allow the internal slider 726 to slide within the external slider 724. The arrangement of posts 752, projections 758 and apertures 753 or external slider 724 and of points 764 on internal slider 726 can be varied accordingly. Front and rear views of the internal slider are shown in FIGS. 17D and 17E. Variations on the geometry of both sliders are within the scope of the present invention provided that the internal slider is operable to telescope within the external slider, and the external slider is operable to telescope within the shell of the fitment.

The fitment 20 of the present invention may be made from any suitable material known by persons skilled in the art. For example, the spout 22, the external slider 24 and the internal slider 26 may be made from any suitable plastic, in particular any plastic suitable for injection molding, which will be known by a person skilled in the art. Examples include, but are not limited to, linear low density polyethylene and polypropylene. In one embodiment of the present invention, the internal slider 26 may be made from a different material from the external slider 24. For example, the internal slider 26 may be made from a softer material, preferably linear low density polyethylene.

Although the invention has been described in terms of a particular preferred embodiment thereof, the skilled practitioner will understand that the external adapter ring can have any configuration needed to accept and mount a dispensing connector. Appropriate flanges, grooves, threads, or the like can be formed on the external surface of the spout 22 as required to contact mating elements on a dispensing connector. The fitment 20 may be used in combination with an internal adapter sleeve that may have a plurality of different internal diameters in different axial regions of the sleeve in order to accommodate a plurality of different dispensing connectors. Similarly, the valve arrangement for opening the valve of the package connector of the invention can be of any type that is appropriate for use with a given dispensing connector. The internal slider can be any type that is actuated by insertion of a probe and moves axially within the external slider between an open and closed position.

The invention claimed is:

1. A fitment for attachment to a container for holding and dispensing a fluid, the fitment comprising:
    a generally cylindrical spout having an external surface capable of mating with a collar of a dispensing connector;
    a generally cylindrical external slider movable axially within said spout and having apertures therein proximate an end thereof; and
    a generally cylindrical internal slider having ports therein and movable axially within said external slider between at least one closed position operable to prevent the flow of fluid through the fitment and an open position wherein said ports are in fluid communication with said apertures to allow the flow of fluid through the fitment, the internal slider being movable from a closed position to the open position by insertion of a dispensing connector into said external slider adjacent said internal slider, to engage said internal slider, the fitment comprising a plurality of deformable members integrally formed at an end of one of the sliders, said deformable members being biased in the open position so as to return said internal slider to a closed position, upon removal of the dispensing connector.

2. The fitment according to claim 1, wherein said deformable members are located on said external slider.

3. A container for holding and dispensing a fluid comprising:
    a fitment attached to a wall of said container, forming a fluid outlet for the container and having a fluid passage therethrough;
    a first generally cylindrical external slider complementarily shaped to said fluid passage and carried therein, the slider being movable axially with respect to the fluid passage and having apertures therein proximate an end thereof;
    a second generally cylindrical internal slider complementarily shaped to said external slider and carried therein and having ports therein, said internal slider movable axially within said external slider, said internal slider movable between at least one closed position operable to prevent the flow of fluid through the fitment and an open position wherein said ports are in fluid communication with said apertures to allow the flow of fluid through the fitment and out of the container, the internal slider being adapted to be moved between a closed and the open position by insertion of a dispensing connector into said external slider adjacent said internal slider to engage said internal slider, the fitment comprising a plurality of deformable members integrally formed at an end of one of the sliders, said deformable members being biased in the open position so as to return said internal slider to a closed position, upon removal of the dispensing connector.

4. The fitment according to claim 1, wherein said apertures are defined by a plurality of radially spaced posts connecting a base of said external slider having said deformable members thereon to the sidewalls of said external slider, said posts being spaced from said spout to allow liquid to flow therethrough in the open position.

5. The fitment according to claim 1, wherein said deformable members integrally formed at an end of one of the sliders are biased in the open position so as to return said internal slider to a closed position by abutting against at least a portion of the other slider.

6. A double slider valve for use in a fitment having a spout, the fitment for attachment to a container for holding and dispensing a fluid, the double slider valve comprising:
    a generally cylindrical external slider movable axially within the spout and having apertures therein proximate an end thereof; and
    a generally cylindrical internal slider movable axially within said external slider and having a series of ports located therein to allow the passage of fluid therethrough, said internal slider movable between at least one closed position operable to prevent the flow of fluid through the fitment and an open position in which the apertures and the ports are aligned and define a passageway through which fluid can flow, the internal slider being adapted to be moved between a closed and the open position by insertion of a dispensing connector into said external slider adjacent said internal slider; and
    a plurality of deformable members integrally formed at an end of one of the sliders, said deformable members being biased in the open position so as to return said internal slider to a closed position, upon removal of the dispensing connector.

7. A valve according to claim 6, wherein said deformable members integrally formed at an end of one of the sliders are biased in the open position so as to return said internal slider to a closed position by abutting against at least a portion of the other slider.

8. A fitment for attachment to a container for holding and dispensing a fluid, the fitment comprising:
    a spout having an external surface capable of mating with a collar of a dispensing connector and defining a fluid passageway therethrough;
    an external slider movable axially within said fluid passageway; and
    an internal slider movable axially within said external slider, said internal slider movable between at least one closed position operable to prevent the flow of fluid through the passageway and an open position operable to allow the flow of fluid through the passageway, the internal slider being adapted to be moved between a closed position and the open position by insertion of a dispensing connector into said external slider adjacent said internal slider; and
    the external slider having integral biasing means located thereon to bias the internal slider into a closed position from the open position.

9. A fitment according to claim 8, wherein the biasing means comprises at least one deformable member located on the external slider, the at least one deformable member biased in the open position by abutting against at least a portion of the internal slider.

10. A container for holding and dispensing fluid comprising:
    a fitment attached to a wall of said container, forming an outlet for the container extending from the fluid storage space within the container;
    an external slider complementarily shaped to said fluid passage and carried therein, the slider being axially movable with respect to the fluid passage; and an internal slider complementarily shaped to said external slider and carried therein, said internal slider movable axially within said external slider between at least one closed position operable to prevent the fluid from flowing through the fitment and an open position operable to allow fluid to flow through the fitment and out of the container, the internal slider being biased towards a closed position from the open position by at least one integral biasing member located on said external slider.

11. A double slider valve for use in a fitment having a spout, the fitment for attachment to a container for holding and dispensing a fluid, the double slider valve comprising:
- a generally cylindrical external slider movable axially within the spout and having apertures therein; and
- a generally cylindrical internal slider movable axially within said external slider and having a series of ports located therein to allow the passage of fluid therethrough, said internal slider movable between at least one closed position operable to prevent the flow of fluid through the fitment and an open position in which the apertures and the ports are aligned and define a passageway through which fluid can flow, the internal slider being adapted to be moved between a closed position and the open position by insertion of a dispensing connector into said external slider adjacent said internal slider; and integral biasing means on said external slider for resiliently biasing said internal slider towards a closed position.

12. A valve according to claim 11, wherein the biasing means comprises deformable members integrally formed on the external slider, which are biased in the open position so as to return said internal slider to a closed position by abutting against at least a portion of the internal slider.

13. A fitment according to claim 1 wherein the fitment comprises two closed positions.

14. A fitment according to claim 1 wherein the fitment comprises a plurality of closed positions.

15. A fitment according to claim 1 wherein the fitment has a closed position prior to insertion of the dispensing connector wherein a seal is formed between a portion of a sidewall of the external slider and a peripheral portion of the internal slider and a closed position after removal of the dispensing connector wherein a seal is formed between another portion of the sidewall of the external slider and a peripheral portion of the internal slider.

16. A fitment according to claim 8 wherein the fitment comprises two closed positions.

17. A fitment according to claim 8 wherein the fitment comprises a plurality of closed positions.

18. A fitment according to claim 8 wherein the fitment has a closed position prior to insertion of the dispensing connector wherein a seal is formed between a portion of a sidewall of the external slider and a peripheral portion of the internal slider and a closed position after removal of the dispensing connector wherein a seal is formed between another portion of the sidewall of the external slider and a peripheral portion of the internal slider.

* * * * *